United States Patent [19]

Kido et al.

[11] Patent Number: 5,011,727

[45] Date of Patent: Apr. 30, 1991

[54] POLYIMIDE RESIN LAMINATE IMPROVED IN SLIDABILITY

[75] Inventors: Masaro Kido; Tetsuo Yoshioka, both of Ohtsu, Japan

[73] Assignee: Kanegafuchi Kagaku Kogyo Kabushiki Kaisha, Osaka, Japan

[21] Appl. No.: 406,387

[22] Filed: Sep. 11, 1989

[30] Foreign Application Priority Data

Sep. 9, 1988 [JP] Japan ................................. 63-227145

[51] Int. Cl.$^5$ .............................................. B32B 33/00
[52] U.S. Cl. .................................. 428/141; 428/473.5; 428/422; 428/147; 428/149; 428/150; 428/421
[58] Field of Search ..................... 428/473.5, 422, 421, 428/543, 147, 141, 143, 149, 150, 352, 156, 172

[56] References Cited

U.S. PATENT DOCUMENTS 4,801,506  1/1989  Motonari ........................ 428/473.5

Primary Examiner—Paul J. Thibodeau
Assistant Examiner—Don Sumihiro
Attorney, Agent, or Firm—Sughrue, Mion, Zinn, Macpeak & Seas

[57] ABSTRACT

The present invention provides a polyimide resin laminate of one layer of a polyimide resin film and one or more layers of activated fluorine resin films, wherein undulations of 0.03–5 μm are formed on the outer surface of the fluorine resin films. According to the present invention, the slidability of the laminate is improved, trouble in the course of taping due to poor slidability is prevented, the taping workability is markedly improved and an improved quality of polyimide laminates is provided.

7 Claims, No Drawings

POLYIMIDE RESIN LAMINATE IMPROVED IN SLIDABILITY

BACKGROUND OF THE INVENTION

1. Field of the Invention

The present invention relates to a polyimide resin film-fluorine resin film laminate, and more particularly to a polyimide resin film-fluorine resin film laminate improved in slidability.

The laminate of this invention is used as tapes for taping a conductor of copper, et cetera, and the conductor so finished is used as motor coils, cables or electric wires for airplanes.

2. Description of the Prior Art

The polyimide resin film-fluorine resin film laminate is usually used as tapes for taping a conductor such as copper. In the process of taping the conductor, however, the work itself is difficult if the tape's slidability is poor, this resulting in, e.g., inclusion of air as taping is made or tension during taping fluctuating due to poor slidability. As the tension fluctuates, troubles occur such as the tape's width decreasing with increasing tension, while if the tension is weak, taping is done loosely so that the tape is displaced or damaged before it is shifted to the next step. Such a defect seriously influences the quality of the final product, this resulting particularly in a marked lowering of the breakdown voltage of the cable or coil, which must particularly be avoided.

SUMMARY OF THE INVENTION

A primary object of the present invention is to provide a polyimide resin laminate improved in slidability, safe from troubles due to poor slidability during taping and improved in taping workability and also improved in quality.

Further objects and advantages will become apparent to those skilled in the art from the detailed explanation below.

In an effort to attain the above objects, the present inventors made intensive studies for solving the aforementioned problems about polyimide resin film-fluorine resin film laminates when using them for taping, specifically for solving the slidability of the fluorine resin film, and arrived at the present invention through discovery of the fact that the above objects can be attained by providing fine undulations on the outer surface of the fluorine resin film.

DETAILED DESCRIPTION OF THE INVENTION

The present invention relates to a laminate of a polyimide resin film and an activated fluorine resin film laminate, wherein fine undulations of 0.03–5 μm are formed on the external surface of the aforementioned fluorine resin film for improvement in the slidability of the laminate.

The polyimide resin film used in the present invention is obtained from a solution of a polyamide acid as a polyamide precursor.

The polyamide acid is represented by the following formula (I) and is obtainable from an aromatic diamine such as 4,4-diaminophenyl ether and an aromatic tetracarboxylic acid dianhydride such as pyromellitic acid dianhydride.

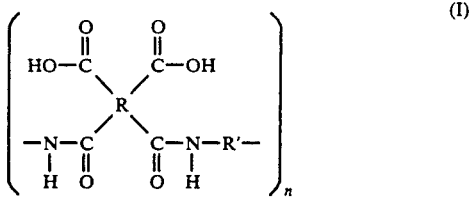

Typical examples of an organic solvent for preparation of the polyamide acid resin solution are N,N-dimethylformamide, N,N-dimethylacetamide, et cetera.

The aforementioned polyamide acid resin solution is first mixed with a dehydrating agent and a catalyst. The typical dehydrating agent is acetic anhydride and the preferred catalyst is a tertiary amine, typical ones being isoquinoline and β-picoline. The proper mixing ratio is 1–8 mols of the dehydrating agent and 0.05–1 mol of the catalyst per mol of the polyamide acid. A mixture of the above composition is extruded onto a supporting body such as a casting drum, belt or the like controlled to 40°–120° C. in temperature through a slit die and after it has become a self-supporting polyamide acid gel film on the supporting body in 5 seconds to 5 minutes, it is stripped off the supporting body and the polyamide acid gel film is pre-dried in a pin-tenter at 100°–200° C. and after curing at 300°–500° C. the polyimide resin film is obtained. The thickness of the polyimide resin film used in the present invention is preferably 7–125 μm.

The fluorine resin film used in the present invention preferably has a fluorine content of not less than 20 weight %, more preferably 50–76 weight %. Typically used are films of tetrafluoroethylene-hexafluoropropylene copolymer (hereinafter called FEP), tetrafluoroethylene-perfluoroalkyl vinylether copolymer (hereinafter called PFA), tetrafluoroethylene-ethylene copolymer (hereinafter called ETFE) and polychlorotrifluoroethylene containing chlorine, et cetera. The preferred thickness of the fluorine resin film is 7.5–125 μm.

The fluorine film is manufactured by extruding a fluorine resin in a form of film through a die such as a T-die.

According to this invention, undulations of 0.03–5 μm are formed on at least on one side of the aforementioned fluorine resin film. If the undulations are less than 0.03 μm, no sufficient improvement in slidability can be hoped for, while, if it is in excess of 5 μm, adverse influences such as inclusion of air will result in the later laminating process.

One of the methods forming the undulations is to mix the fluorine resin with a filler before extruding the fluorine resin so as to produce the undulations in the extruded film. As the filler, preferred is an inorganic fine powder or a fluorine resin having a higher melting point than the aforementioned fluorine resin film. The inorganic fine powder may be selected from $SiO_2$, $TiO_2$ or $CaHPO_4$, $Ca_2P_2O_7$ in powder form. As the fluorine resin higher in melting point than the aforementioned fluorine resin film, tetrafluoroethylene polymer, et cetera, may be selected, for example, when the aforementioned fluorine resin film is of tetrafluoroethylene-hexafluoropropylene. These fillers may be used singly or in a combination of two or more. As to the particle size of these fillers, adopted are those not more than 20 μm, preferably 1–5 μm.

As mentioned above, to add a filler of more than 5 μm in particle size to a fluorine resin film whose thickness is in a range of 7.5–125 μm is effective indeed in forming the undulations on the surface of the film but this at the same time substantially means imparting physical damage to the film, this tending to decrease film's mechanical strength. Adding particles less than 1 μm has little influence on the film's physical properties but it is then difficult to produce sufficient undulations for improving the film's slidability. The proper amount of the aforementioned filler to be added is somewhat different according to the kind thereof but, when $CaHPO_4$ is used, for instance, the proper range is 0.05–1.0 weight % with respect to the film. When the amount added is too small, the undulations required for improvement of slidability cannot be formed, while, when it is excessive it is difficult to have it uniformly dispersed in the fluorine resin, this resulting in impairing uniformity of the fluorine resin film. Worse, it largely affects the film's color and causes a lowering of transparency.

Another method of forming the undulations in the fluorine resin film is to extrude the fluorine resin in a film form by a T-die mounted extruder and immediately thereafter bring it into contact with an embossing roll to thereby produce the undulations of 0.03–5 μm on the surface of the fluorine resin film. On the surface of the metallic embossing roll, there are formed protrusions by a matte finish or hairline finish (lines along the rotating direction of the rolls), the height of which is 5–50 μm.

Although the size of the matte or the hairline is not specifically limited, preferably it is approximately in the range of several μm–1 mm. The density of the protrusions is preferably high and the roll having the protrusions with high density over the whole surface is preferred. When the height of the protrusions is too low or when the size thereof is too small, a sufficient effect of improving the slidability is not expected, while, when the height is too high, breakage sometimes takes place depending on the film's thickness. And when the size is too large, the undulations do not stand on the surface of the film but impart unevenness even to the entire thickness direction of the film, causing troubles such as inclusion of air in the later laminating step.

The fluorine resin film having the undulations of 0.03–5 μm in its surface formed by the foregoing methods is then passed to the next step of surface activation.

As methods of activating the fluorine resin film, there are included corona discharge treatment in the atmosphere or in the presence of or absence of an organic solvent gas or an inorganic gas, flame treatment, or a dipping treatment in an alkali metal solution. As a rule, activation is applied to both sides of the fluorine resin film.

In laminating the polyimide film and the fluorine resin film in 2 or 3-plys, since the undulations are produced at least on one side through addition of a filler or contact with an embossing roll, it is necessary to laminate the side with less undulations on the surface facing the polyimide resin film. As it is clear from the purport of this invention, it is necessary to carry out lamination with the side more marked in unevenness outward. If the side of more marked unevenness is laminated facing the polyimide resin side, not only can the improvement in slidability normally resulting from the unevenness of the fluorine resin film not be well expected but also lamination itself is interfered with.

Laminating the polyimide resin film with the activated fluorine resin film is accomplished by passing two kinds of films through between a rubber roll and a hot roll preheated at 200°–260° C. The press roll's pressure is preferably at least 0.5 kg/cm$^2$, and the time of passing between press rolls is preferably 0.001–1 sec.

For laminating the fluorine films on both sides of the polyimide resin film, there are two alternative methods of first laminating two layers (that is, polyimide resin film and fluorine resin film) and then passing it once more with another fluorine resin film to thus obtain a three-layer laminate and passing between press rolls a single layer of the polyimide resin film and two layers of the fluorine resin films simultaneously to thus obtain a 3-layer laminate in a single step.

The laminate obtained by either of the aforementioned methods is slit into tapes and is taped around the conductor by a taping device and the taped conductor is used as coils for motors, cables, or electric wires for aircraft.

According to the present invention, the slidability of the laminate is markedly improved, troubles in the course of taping due to poor slidability are prevented and not only is taping workability improved but also an improved quality of products is ensured.

What is claimed is:

1. A polyimide resin laminate improved in slidability comprising a polyimide resin film and at least one activated fluorine resin film, wherein undulations of 0.03–5 μm in height are formed on at least the outer surface of the aforementioned at least one activated fluorine resin film facing outward from the polyimide resin film side.

2. A laminate according to claim 1, wherein said undulations are formed at least on one side of the fluorine resin film by means of an metallic embossing roll.

3. A laminate according to claim 1, wherein said undulations are formed at least on one side of the fluorine resin film by means of a filler.

4. A laminate according to claim 3, wherein said filler is at least one selected from the group consisting of inorganic fine particles and fluorine resins having a melting point higher than that of the fluorine resin film.

5. A laminate according to claim 1, wherein said laminate comprises two layers, namely one layer of the polyimide film and one layer of the fluorine resin film.

6. A laminate according to claim 1, wherein said laminate comprises three layers, namely one layer of the polyimide film and two layers of the fluorine resin film.

7. A laminate according to claim 1, 5 or 6, wherein said fluorine resin film is of a tetrafluoroethylene-hexafluoropropylene copolymer.

* * * * *